(12) United States Patent
Doshi et al.

(10) Patent No.: US 7,925,744 B1
(45) Date of Patent: Apr. 12, 2011

(54) DETERMINING MAC STATE USING SEQUENCE NUMBERS IN A DISTRIBUTED ENVIRONMENT

(75) Inventors: Sanjiv Doshi, San Jose, CA (US); Rajagopalan Subbiah, San Jose, CA (US); Apurva Mehta, Cupertino, CA (US); Kumar Mehta, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 327 days.

(21) Appl. No.: 12/188,769

(22) Filed: Aug. 8, 2008

(51) Int. Cl.
 *G06F 15/173* (2006.01)
 *H04L 12/28* (2006.01)
 *G06F 11/00* (2006.01)

(52) U.S. Cl. .......................... 709/224; 370/389; 714/18

(58) Field of Classification Search .................. None
See application file for complete search history.

(56) References Cited

U.S. PATENT DOCUMENTS

| 7,499,447 B2 * | 3/2009 | Shenoy et al. ............ 370/389 |
| 2005/0210324 A1 * | 9/2005 | Abe et al. ................. 714/18 |

OTHER PUBLICATIONS

Jarman, ["A Brief Introduction to Signa Delta Conversion"], May 1995.*

* cited by examiner

*Primary Examiner* — Wen-Tai Lin
(74) *Attorney, Agent, or Firm* — Sanford E. Warren, Jr.; Akin Gump

(57) ABSTRACT

A derived state value is calculated based on a plurality of component state values. As any of the plurality of component state values changes, the derived state value is recalculated. When sending information about a MAC address or other data between two components, the derived state value is included in the information sent. An object receiving a MAC address or other data from another object checks the validity of the received derived state value to determine whether to accept the new data and flush old data, to accept the new data, or to ignore the new data.

29 Claims, 6 Drawing Sheets

US 7,925,744 B1

DETERMINING MAC STATE USING SEQUENCE NUMBERS IN A DISTRIBUTED ENVIRONMENT

TECHNICAL FIELD

The present invention relates to the field of computer networking, and in particular to a network devices comprised of distributed elements.

BACKGROUND ART

In some routers, L2 forwarding components on all line cards and control modules run independently. Changes to system objects like global layer 2 configuration parameters (L2-global), routing-instances (RTB), bridge-domains (BD), logical-interfaces (IFL), interface family (IFF) and bridge interfaces (IFBD) are notified to L2 forwarding components at different times and order. For example, as new Media Access Control (MAC) addresses are learned, these MAC addresses are forwarded between L2 objects. Most implementations keep a separate MAC state for each object. This increases code complexity, impacts code maintainability and has an impact on system responsiveness.

SUMMARY OF INVENTION

In one embodiment a method of determining state in a distributed environment, comprises generating a plurality of object state values, one for each of a plurality of objects, combining the plurality of object state values into a derived state value, updating the derived state value in a first object of the plurality of object state values, detecting a change in the derived state value by a second object of the plurality of objects, and flushing a datum associated with the second object responsive to detecting the change in the derived state value, wherein the first object and the second object can be the same object.

In another embodiment, a method for managing a datum in a distributed environment, comprises creating a plurality of objects in the distributed environment, assigning an object state value to each of the plurality of objects, computing a first derived state value from the object state values assigned to each of the plurality of objects, associating the first derived state value with a first datum, receiving a second datum and an associated second derived state value, and determining whether to flush the first datum responsive to a comparison between the first derived state value and the second derived state value.

In another embodiment, a networking device, comprises a plurality of processing elements, an object state value associated with each of the plurality of processing elements, a derived state value derived from a combination of the object state values, a storage medium, configured to store a series of instructions, which when executed cause one of the plurality of processing elements to perform actions comprising: detecting a change in the derived state value by a first processing element of plurality of processing elements, and flushing a datum associated with the first processing element responsive to detecting the change in the derived state value.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, a MAC sequence number is used as an example of a derived state value that can be monitored and inspected for controlling a distributed environment, and a MAC address is used as an exemplary datum to be controlled and flushed if desired. The disclosed embodiments are not limited to MAC sequence numbers or MAC addresses, and any derived state value and data can be controlled using the disclosed techniques and systems.

Figure 1:
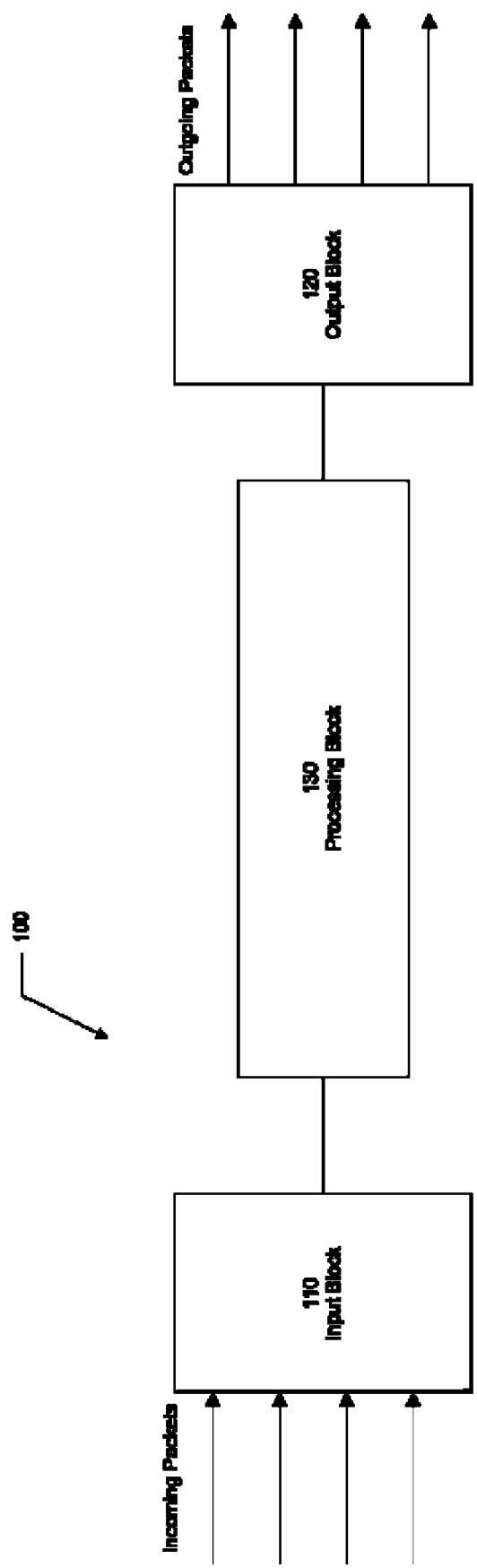
FIG. 1 is a block diagram illustrating an exemplary router according to one embodiment.

FIG. 1 is a block diagram of an exemplary data processing device 100 according to one embodiment. Device 100 may include input block 110, output block 120 and L2 processing block 130.

Input block 110 may include one or more input units (e.g., input line cards) that may receive packets on ingress links and perform initial processing on the packets. In one embodiment, the initial processing may include analyzing a packet to identify its control information and its packet data (e.g., payload). The control information may include information from the header of the packet, and the packet data may include information from a payload of the packet. In one embodiment, the control information may include a source address and/or a destination address from a header of a packet. In another embodiment, the control information may include a source address, a destination address, priority information, and/or other information from a header of the packet. Output block 120 may include one or more output units (e.g., output line cards) that may receive packet information from processing block 130 and output the packets on egress links.

Processing block 130 may include processing logic that may perform layer 2 learning and forwarding functions and handle packet transfers between input block 110 and output block 120. Processing block 130 may receive the control information from input block 110 and process the control information based on data structures stored.

Figure 2:
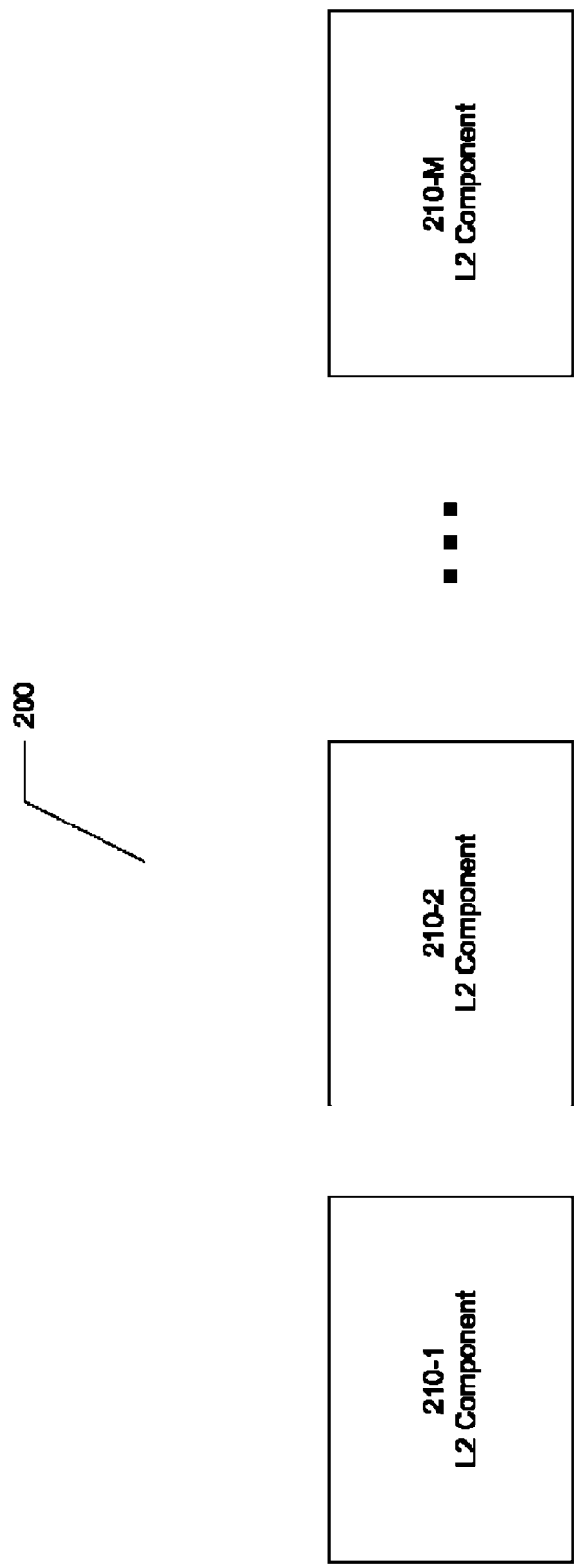
FIG. 2 is a block diagram illustrating a portion of the processing block of FIG. 1 according to one embodiment.

FIG. 2 is a diagram of an exemplary portion of processing block 130. Processing block 130 may include multiple L2 components 210-1, 210-2 . . . 210-M (where M>1) (collectively referred to herein as "L2 component 210"). L2 components 210 may operate independently of each other and/or in parallel. Each of L2 components 210 may include processing logic to process control information associated with a particular packet. In one implementation, a L2 component 210 may determine how to forward a packet (e.g., determine on which egress link the packet should be transmitted), collect particular statistics regarding the packet, and/or perform one or more management functions with regard to the packet.

A derived state value, in some embodiment is a MAC sequence number that is derived from system objects like the L2-global, RTB, BD, IFL, IFF, and IFBD objects helps to easily identify the state of the MAC based on current state of the system objects. In a quiescent state, all L2 forwarding components should have the same set of MACs with the same MAC sequence number.

Figure 3:
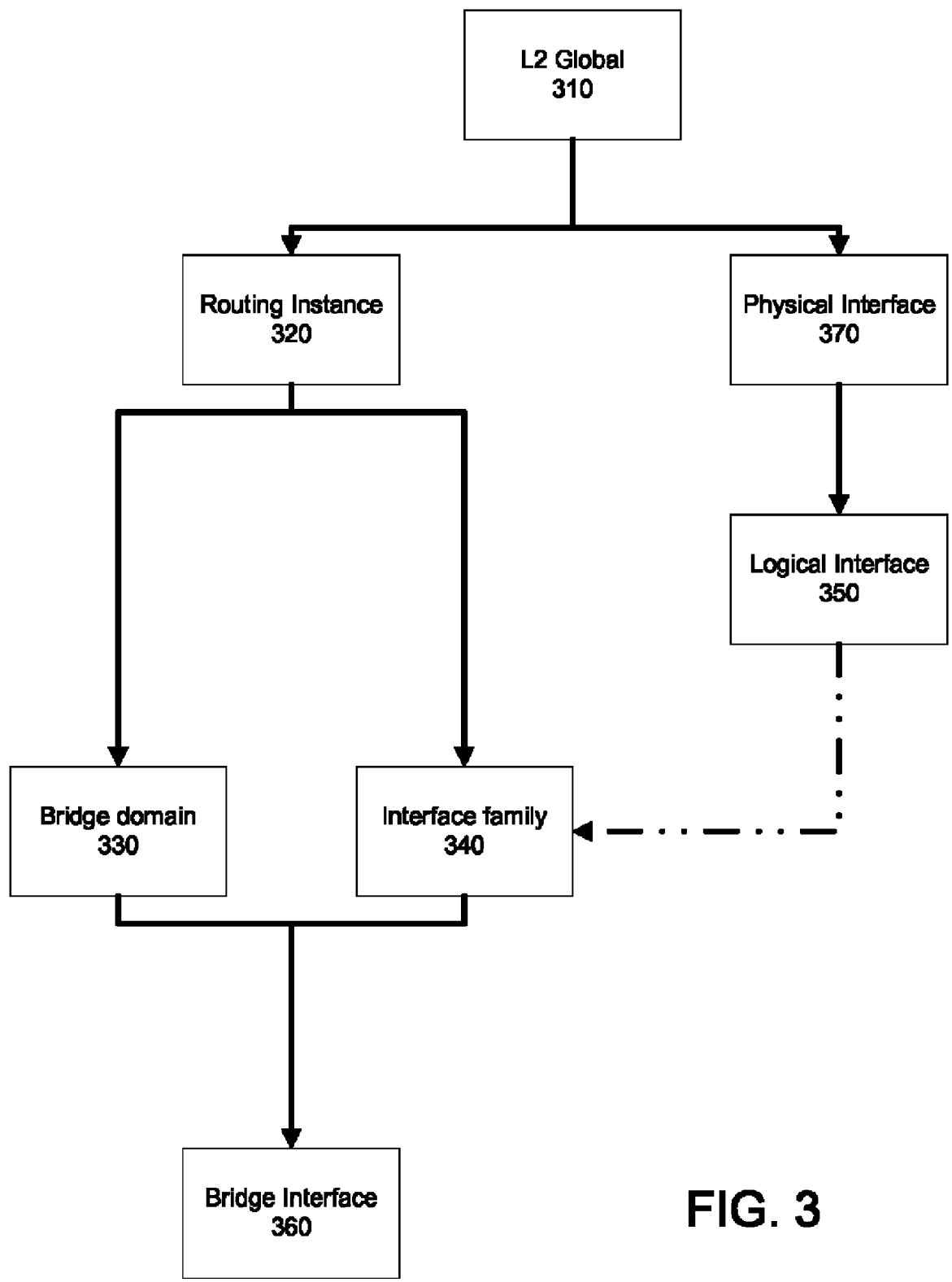
FIG. 3 is block diagram illustrating a hierarchy of L2 forwarding objects according to one embodiment.

In one embodiment, a number of system objects related to L2 forwarding are created as a hierarchy of objects as illustrated in FIG. 3. As illustrated in FIG. 3, an L2 global object 310 relates to one or more RTBs 320, which relates to one or more bridge domains 330. The L2 global object also relates to the physical interfaces 370, which relate to IFLs 350. The IFF 340 is dependent on both the RTB 320 and the IFL 350. Similarly, the IFBD 360 is dependent on both the BD 330 and the IFF 340. Other hierarchies or non-hierarchical relationships can be used in other embodiments as desired. In some embodiments, for example, no bridge domains 330 or bridge interfaces 360 are used.

System objects like the L2-global, IFL, IFF, IFBD, BD, and RTB objects are created before MAC addresses can be learned. Each of these objects is assigned its own object state value, typically an object sequence number that is initialized to 0 when the object is created. A MAC sequence number is derived from the object sequence numbers of these objects and are stored with each learned MAC. The current MAC sequence number is also kept in the lowest level system object, which in some embodiments is an IFL and in other embodiments is an IFBD. In other embodiments, the current MAC sequence number can be kept in an object other than the lowest level system object.

Figure 4:
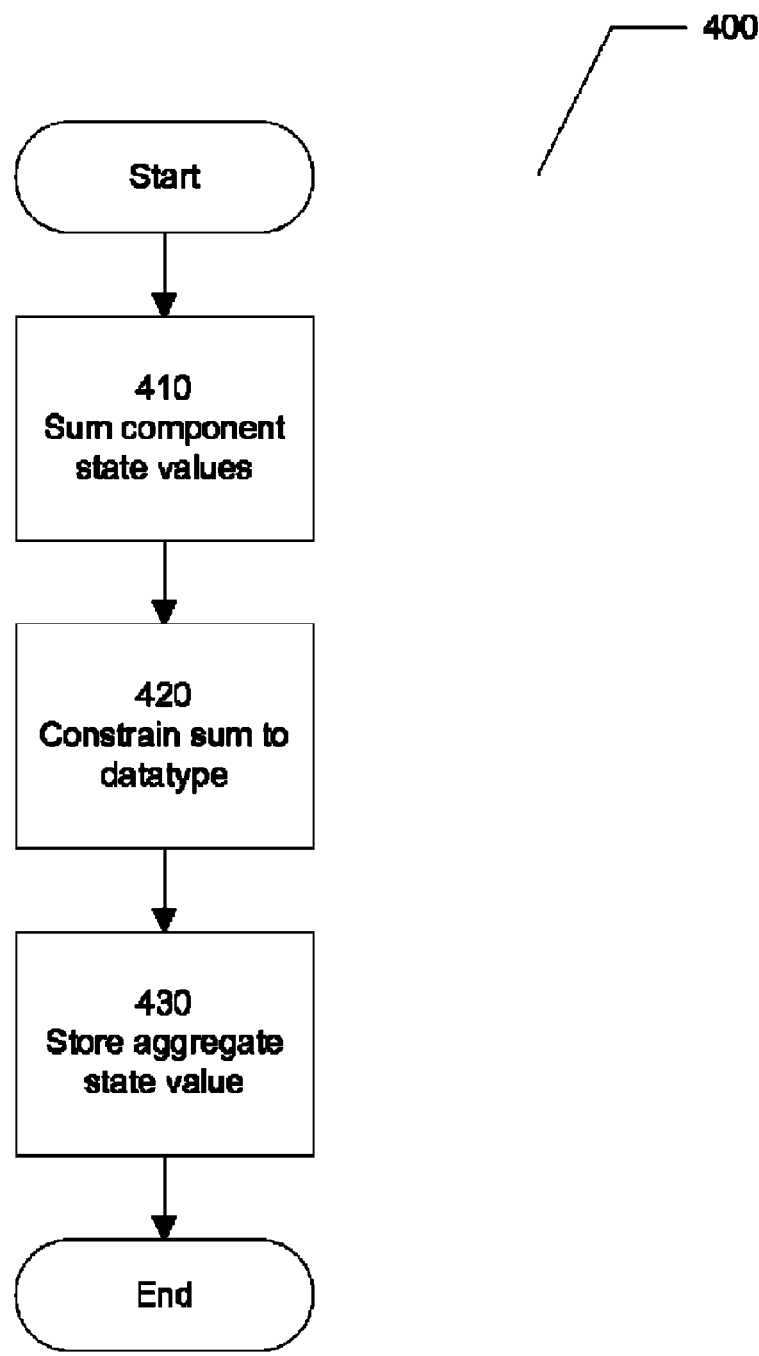
FIG. 4 is a flowchart illustrating a technique for generating a derived state value according to one embodiment.

In one embodiment, the algorithm to derive the MAC sequence number is as illustrated in FIG. 4. In block 410, all of the object state values or object sequence numbers are combined by adding them together. Then in step 420, the sum is constrained to the data type of the MAC sequence number that functions as a derived state value. The data type of the MAC sequence number is dependent upon the data type of the object state values. In one embodiment, the data type of the MAC sequence number must be the least common denominator or smaller, typically the smallest size, of any of the data types used to store the object state values. This makes the computed MAC sequence number entirely based on the changes to the constituent objects sequence numbers and agnostic to rollover condition. Then in step 430, the derived state value is stored as a MAC sequence number in the lowest level system object. As an equation, that can be expressed as follows in one embodiment:

mac_seq_no=(mac_seq_t)(gcfg_seq_no+rtb_seq_no+ ifl_seq_no+iff_seq_no);

In another embodiment, the algorithm to derive the MAC sequence number is similar, adding additional elements to the calculation:

mac_seq_no=(mac_seq_t)(gcfg_seq_no+rtb_seq_no+ bd_seq_no+ifl_seq_no+iff_seq_no+ifbd_se- q_no);

where:
gcfg_seq_no=L2 global sequence number;
rtb_seq_no=routing-instance sequence number;
bd_seq_no=bridge-domain sequence number;
iff_seq_no=interface family sequence number;
ifl_seq_no=logical-interface sequence number;
ifbd_seq_no=bridge-interface sequence number; and
mac_seq_t is a data type.

In one embodiment, the data type mac_seq_t is 16-bit unsigned integer. The various object state values or object sequence numbers do not have to be of the same type as the data type mac_seq_t. The only requirement is that the size of mac_seq_t must be the smallest of any of the constituent objects sequence number. For example, the gcfg_seq_no associated with the L2 global object could be 32-bit unsigned number, not a 16-bit unsigned number.

Any time any of the constituent object's state value is changed, the derived state value is recomputed and stored in the lowest level system object. The lowest level system object is the IFL in one embodiment and the IFBD in other embodiments.

One limitation with this approach is that difference in the MAC sequence number between all the L2 forwarding modules cannot be greater than 32K, i.e. the difference between L2 forwarding module which is ahead and the one that is lagging cannot be more than 32K. This number is adequate, as this issue is not expected to occur in any real life scenario. If it does happen, we can change the size of MAC sequence number to 32-bit unsigned.

Figure 5:
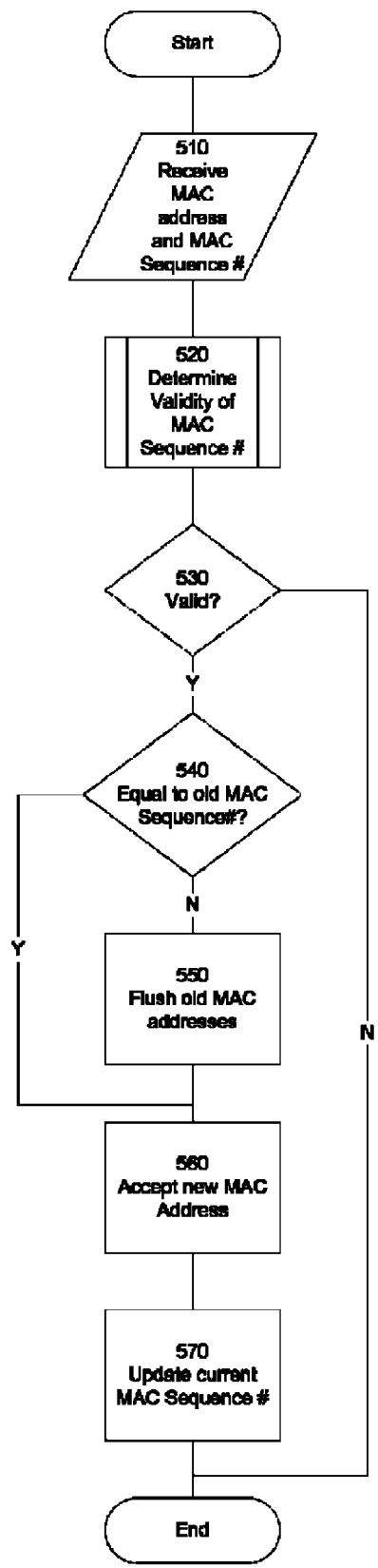
FIG. 5 is a flowchart illustrating a technique for using a derived state value for synchronizing objects in a distributed environment according to one embodiment.

Turning to FIG. 5, a flowchart illustrates a technique for using a derived state value according to one embodiment. In an exemplary situation in this embodiment, when a new local source MAC is learned from the hardware, the packet forwarding engine (PFE) side component of L2 forwarding (the L2ALM module) assigns a MAC sequence number derived from the lowest level object as discussed above. In block 510, the L2 component on the routing engine (RE), known as the L2ALD module, receives the new MAC address and the new MAC sequence number from the L2ALM module. The L2ALD and L2ALM modules or objects are exemplary and illustrative only, and other modules or objects can communicate similarly. The L2ALD module then determines in block 520 whether the new MAC sequence number received in block 510 is valid. In block 530, if the new MAC sequence number is invalid, then the new MAC address is ignored. If the received MAC sequence number is valid, then in block 540 the L2ALD object determines whether the new MAC sequence number is equal to the MAC sequence number already known to the L2ALD object. If not, then in block 550, the L2ALD object flushes previously learned MAC addresses. This flushing of MAC addresses can be done in the background.

In either event, the L2ALD will accept the new MAC address in block 560, if the new MAC sequence number is valid. Finally, the L2ALD object will update its current MAC sequence number with the received MAC sequence number.

The flowchart of FIG. 5 is exemplary and illustrative only, and other steps, and ordering of steps, can be used. For example, in one embodiment, once the L2ALD object accepts the new MAC address, it will send an acknowledgement to the L2ALM object, which will include the MAC sequence number. The L2ALM module can then test the MAC sequence number received in the acknowledgement and decide whether to accept or reject the acknowledgement.

Although the above is described in terms of one module sending information about a MAC address to another, other scenarios can use the MAC sequence number to cause flushing of MAC addresses, keeping independent modules synchronized. For example, some embodiments provide for configuration changes that require MAC flush, e.g. enabling no-mac-learning, enabling or disabling MAC-statistics, etc. In this scenario, any daemon or control module kernel can decide to increment the sequence number of the object whose attributes have changed. This would result in independent flushing of MACs on all PFEs and all control modules, which can be done in the background.

In one embodiment, when configuration changes are committed in the routing engine (RE), the L2ALD module is notified of the change. If the L2ALD module sees a change, it issues a change to the RE kernel, and tells the kernel to update the corresponding object sequence number. A typical update to an object sequence is to increment the object sequence number by one, but other techniques for changing the object sequence number can be used. The kernel then passes the new object sequence number to every module interested in it, which in one embodiment is L2ALD and L2ALM.

Thus, the L2ALD module gets the new sequence number back as a changed sequence number, causing a recomputation of the MAC sequence number. The IFBD or IFL, in the two exemplary embodiments described above, gets the changed sequence number, causing it to recompute the MAC sequence number. If that change produces a valid MAC sequence number, then the IFBD (or IFL) flushes the previously known MAC address information. This flushing can be done in the background.

Similarly, a Layer 3 control protocol or user initiated flush can affect the MAC sequence number. As described above, the sequence number of the object where the flush is desired is incremented, resulting in flushing of MACs similar to the situation where a configuration change updates the MAC sequence number. Other scenarios that desire to cause flushing of MAC addresses can use the above technique to trigger such flushing. This flushing can be done in the background.

Figure 6:
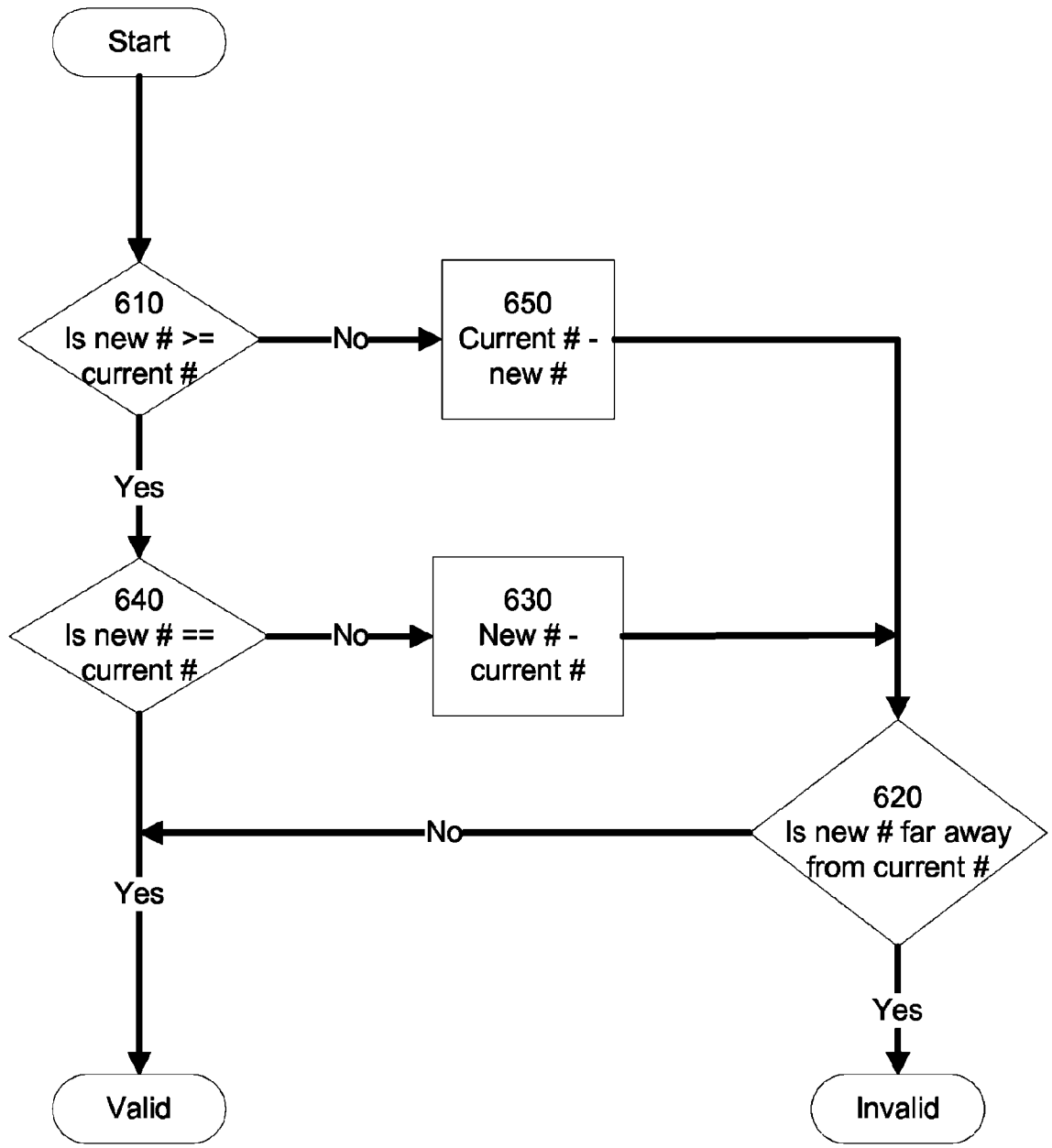
FIG. 6 is a flowchart illustrating a technique for determining whether a new derived state value is valid according to one embodiment.

Turning now to FIG. 6, a flowchart illustrates a technique for determining whether a new MAC sequence number or other derived state value is valid according to one technique. Block 610 and 640 determine if the new MAC sequence number is greater or less than the current MAC sequence number. The difference between current and new MAC sequence number is calculated in block 630 and 650 based on whether the computed new MAC sequence number is greater or less than the current MAC sequence number.

If the new MAC sequence number is less than the current MAC sequence number, then the new number may still be valid. In one embodiment, the MAC sequence number is a 16-bit unsigned integer value, so if the sequence number is incremented past the maximum possible value (65,535), the value will overflow, resulting in a lower value, essentially wrapping around the possible values. For example, in 16-bit unsigned integer arithmetic, 65,535 plus 2 will result in a value of 1.

In some embodiments, a MAC sequence number one half the number of possible values away from the current MAC sequence number or more is considered invalid, indicating that the datum could be old and should not be accepted. Thus in block 620, the validity of the distance between the two values is calculated.

In one embodiment, this difference is calculated by subtracting the current MAC sequence number from a value of all is (~0), then adding the new MAC sequence number, which effectively computes the absolute value of the difference between the two numbers. The result is then compared with one-half the number of possible values, in the case of a 16-bit unsigned number, 32,767. If the result is less than one-half the number of possible values, the new MAC sequence number is considered valid. In one embodiment, the value of one half the number of possible values is obtained by exclusive ORing (XORing) an all ones value with a 1 bit shifted left one less than the number of bits used to represent the value. E.g., in the case of a 16-bit unsigned number, a 1 would be left shifted by 15 bits, moving the 1 bit into the highest significant bit in the value.

For example, if the MAC sequence number is stored as a 16-bit unsigned integer, this calculation XORs the value 1111111111111111 (expressed as a binary value) with the value 1000000000000000, producing the value 0111111111111111, or 32,767 expressed as decimal value.

Other types of data can be used, with corresponding values. It is unlikely that two L2 forwarding modules would ever be so out of synch. If the difference between the lagging and ahead MAC sequence number needs to allow for values greater than 32,767, then a 32-bit unsigned integer or some other convenient large bit size value can be used, which may also require increasing the size of one or more of the object sequence numbers, so that the MAC sequence number has a size no greater than the smallest size of any of the object sequence numbers. Although unsigned arithmetic is used in the above description, the disclosed embodiments are not limited to using unsigned arithmetic, and signed arithmetic can be used if desired, at the cost of additional computational complexity. Similarly, other techniques can be used to determine the relative difference between two values and whether the difference exceeds a desirable threshold.

In one embodiment in software, the calculations for the above are represented in C #define directives as follows:
  #define NBBY 8
  #define L2AL_VALID_MAC_SIZE (((mac_seq_t)~0)^(1<<((sizeof(mac_seq_t)*NBBY)−1)))

define L2AL_IS_VALID_MAC_SEQ_NO(curr_seq_no, new_seq_no)\

((new_seq_no>=curr_seq_no ? new_seq_no_curr_seq_no:\

((mac_seq_t)~0−curr_seq_no+new_seq_no)
    <L2AL_VALID_MAC_SIZE)

where mac_seq_t is the data type of the MAC sequence number, such as a 16-bit unsigned integer.

The embodiments described above implement this technique in software. Any MACs learned from the hardware search queue are always given the current MAC sequence number. For better accuracy, the MAC sequence number can be programmed in hardware, but in some embodiments, the hardware cost of such an implementation is so high compared to the benefit gained by the hardware implementation that a software solution is acceptable.

Although the above-disclosed embodiments have used a derived state value that corresponds to a MAC state, the disclosed derived state value is not limited to keeping track of MAC addresses, but can be used for any data that might be shared between independent modules. The above embodiments have been described using a C language macro construct, but any suitable programming language can be used, and macros, subroutines, or inline code could be used instead for the calculation of whether the derived state value is valid. Although the above examples have used a 16-bit unsigned value for the MAC sequence number, any desired size unsigned integer value can be used.

The uses for a derived state value described above are exemplary and illustrative only, and other uses of such a derived state value can be made.

While certain exemplary embodiments have been described in details and shown in the accompanying drawings, it is to be understood that such embodiments are merely illustrative of and not devised without departing from the basic scope thereof, which is determined by the claims that follow. By way of example and not limitation, the specific logical components utilized may be replaced by known equivalents or other arrangements of components that function similarly and provide substantially the same result.

What is claimed is:

1. A method of determining state in a distributed environment of one or more network devices, comprising:
    generating a plurality of object state values in a network device, one for each of a plurality of objects;
    combining the plurality of object state values into a derived state value;
    updating the derived state value in a first object of the plurality of object state values;
    detecting a change in the derived state value by a second object of the plurality of objects;
    flushing a datum associated with the second object responsive to detecting the change in the derived state value,
    wherein the first object and the second object can be the same object and;
    wherein detecting a change in the derived state value by the second object of the plurality of objects comprises:
        determining whether an updated derived state value is valid; and
        wherein the updated derived state value is valid if the absolute value of the difference between the updated derived state value and the derived state value is less than one-half the number of possible derived state values.

2. The method of claim 1, wherein combining the plurality of object state values into a derived state value comprises:
    summing each of the object state values to produce the derived state value.

3. The method of claim 2, wherein summing each of the object state values to produce the derived state value comprises:
    summing each of the object state values using unsigned arithmetic ignoring overflow.

4. A method of determining state in a distributed computer environment of one or more network devices, comprising:
    generating a plurality of object state values in a network device, one for each of a plurality of objects;
    combining the plurality of object state values into a derived state value;
    updating the derived state value in a first object of the plurality of object state values;
    detecting a change in the derived state value by a second object of the plurality of objects;
    flushing a datum associated with the second object responsive to detecting the change in the derived state value,
    wherein the first object and the second object can be the same object;
    wherein each of the plurality of object state values has an associated object state characteristic,
    wherein the object state characteristic of a first object state value of the plurality of the object state values can be different from the object state characteristic of a second object state value of the plurality of object state values;
    wherein the derived state value has an associated global state characteristic; and
    wherein the characteristic of the derived state value is dependent on the object state characteristics of all dependent objects.

5. The method of claim 4, wherein detecting a change in the derived state value by the second object of the plurality of objects comprises:
    determining whether an updated derived state value is valid;
    wherein the updated derived state value is valid if the absolute value of the difference between the updated derived state value and the derived state value is less than one-half the number of possible derived state values.

6. The method of claim 1, further comprising:
    updating an object state value of the plurality of object state values to indicate a change in state of the corresponding object of the plurality of objects.

7. The method of claim 1, wherein updating an object state value comprises:
    incrementing the object state value to indicate a change in state of the corresponding object of the plurality of objects.

8. The method of claim 1, wherein each of the object state values of the plurality of object state values is an unsigned arithmetic value.

9. The method of claim 1, wherein the datum is a media access control address.

10. The method of claim 1, wherein flushing a datum associated with the second object responsive to detecting the change in the derived state value comprises:
    receiving a new datum and a new derived state value by one of the plurality of objects; and
    if the new derived state value is valid storing the new datum in the first object.

11. The method of claim 1, wherein flushing a datum associated with the second object responsive to detecting the change in the derived state value comprises:
    receiving a new datum and a new derived state value by one of the plurality of objects; and
    if the new derived state value is valid and not equal to the derived state value, flushing the datum.

12. The method of claim 4, wherein the datum is a media access control address.

13. The method of claim 1, wherein an initial value of each object state value is zero.

14. The method of claim 1, further comprising:
    validating the derived state value against a previously stored derived state value.

15. The method of claim 1, wherein flushing a datum associated with the second object responsive to detecting the change in the derived state value is performed in the background.

16. A method for managing a datum in a distributed environment of one or more network devices, comprising:
    creating a plurality of objects in the distributed environment;
    assigning an object state value to each of the plurality of objects;
    computing a first derived state value from the object state values assigned to each of the plurality of objects in a network device;
    associating the first derived state value with a first datum;
    receiving a second datum and an associated second derived state value;
    determining whether the second derived state value is valid,
    and
    determining whether to flush the first datum responsive to a comparison between the first derived state value and the second derived state value;
    wherein the second derived state value is valid if the absolute difference between the first derived state value and the second derived state value is less than or equal to one half the number of possible derived state values.

17. The method of claim 16, wherein computing a first derived state value comprises:
summing the object state value of each of the plurality of objects.

18. The method of claim 16, further comprising:
updating an object state value responsive to a change in the object of the plurality of objects to which the object state value is assigned; and
computing an updated first derived state value from the object state values assigned to each of the plurality of objects.

19. The method of claim 16, wherein determining whether to flush the first datum comprises:
if the second derived state value is valid and not equal to the first derived state value, flushing the first datum.

20. The method of claim 16, wherein determining whether to flush the first datum further comprises:
if the second derived state value is valid, accepting a second datum associated with the second derived state value.

21. The method of claim 16, wherein determining whether to flush the first datum further comprises:
if the second derived state value is invalid, ignoring a second datum associated with the second derived state value.

22. The method of claim 16,
wherein the first datum is a first media access control address; and
wherein the second datum is a second media access control address.

23. The method of claim 16, further comprising:
flushing the first datum in the background.

24. The method of claim 16,
wherein each of the object state values has a size, and
wherein the first derived state value has a size no greater than the size of any of the object state values.

25. A networking device, comprising:
a plurality of processing elements;
an object state value associated with each of the plurality of processing elements;
a derived state value derived from a combination of the object state values;
a storage medium, configured to store a series of instructions, which when executed cause one of the plurality of processing elements to perform actions comprising:
detecting a change in the derived state value by a first processing element of plurality of processing elements;
determining whether an updated derived state value is valid; and
flushing a datum associated with the first processing element responsive to detecting the change in the derived state value;
wherein the updated derived state value is valid if the derived state value is less than the updated derived state value, and
wherein the updated derived state value is valid if the absolute value of the difference between the updated derived state value and the derived state value is less than one half the number of possible derived state values, and
wherein flushing a datum associated with the first processing element responsive to detecting the change in the derived state value only flushes the datum if the updated derived state value is valid.

26. The networking device of claim 25,
wherein the object state values are object sequence numbers, and
wherein the derived state value is a media access control sequence number.

27. The networking device of claim 25, wherein the actions further comprise:
summing the object state values associated with the plurality of processing elements, storing the sum as the derived state value.

28. The networking device of claim 25, wherein the datum is a media access control address.

29. The networking device of claim 25, wherein flushing a datum associated with the first processing element responsive to detecting the change in the derived state value is performed in the background.

* * * * *